US011422062B2

(12) United States Patent
Dinter

(10) Patent No.: US 11,422,062 B2
(45) Date of Patent: Aug. 23, 2022

(54) METHOD FOR PREDICTING DAMAGE TO A COMPONENT OF A ROLLER BEARING

(71) Applicant: Flender GmbH, Bocholt (DE)

(72) Inventor: Ralf Martin Dinter, Gelsenkirchen (DE)

(73) Assignee: FLENDER GMBH, Bocholt (DE)

( * ) Notice: Subject to any disclaimer, the term of this patent is extended or adjusted under 35 U.S.C. 154(b) by 140 days.

(21) Appl. No.: 17/006,344

(22) Filed: Aug. 28, 2020

(65) Prior Publication Data

US 2021/0063275 A1    Mar. 4, 2021

(30) Foreign Application Priority Data

Aug. 29, 2019  (EP) .................................. 19194385

(51) Int. Cl.
*G01M 13/04*    (2019.01)
*G05B 23/02*    (2006.01)

(52) U.S. Cl.
CPC ......... *G01M 13/04* (2013.01); *G05B 23/0283* (2013.01); *F16C 2233/00* (2013.01)

(58) Field of Classification Search
CPC ................ G01M 13/04; G05B 23/0283; F16C 2233/00; G06F 2119/04
See application file for complete search history.

(56) References Cited

U.S. PATENT DOCUMENTS

| | | | | |
|---|---|---|---|---|
| 2016/0370259 | A1* | 12/2016 | Loverich | G01N 29/14 |
| 2017/0286572 | A1* | 10/2017 | Hershey | B64F 5/60 |
| 2019/0017899 | A1* | 1/2019 | Loos | F16C 19/52 |

FOREIGN PATENT DOCUMENTS

DE    10 2004 048 649 A1    4/2006

OTHER PUBLICATIONS

Manieri Francesco et al: "The origins of white etching cracks and their significance to rolling bearing failures", International Journal of Fatigue, Elsever, Amsterdam, NL, vol. 120, pp. 107-133, XP085584468, ISSN: 0142-1123, DOI: 10.1016/J.IJFATIGUE.2018. 10 023 the whole document; 2018.
Arnaud Ruellan Du Crehu am Institut National de Sciences Appliquées. Promotionsschrift "Tribological analysis of White Etching Crack (WEC) failures in rolling element bearings"; pp. 1-285; Mechanics of materials; INSA de Lyon, 2014. English.

* cited by examiner

*Primary Examiner* — Manuel L Barbee
(74) *Attorney, Agent, or Firm* — Henry M. Feiereisen LLC

(57) ABSTRACT

In a method for predicting damage to a roller bearing, a plurality of physical variables of at least one component of the roller bearing is acquired. From the physical variables and from type information of the roller bearing at least a first influencing variable and a second influencing variable are established and based on the at least first and second influencing variables a damage contribution to damage to the roller bearing caused by a White Etching Crack (WEC) mechanism is established and the damage contribution is added to form a damage sum. A remaining service life of the at least one component of the roller bearing due to the damage caused by the WEC mechanism from the damage sum and a first damage accumulation model is then established.

13 Claims, 3 Drawing Sheets

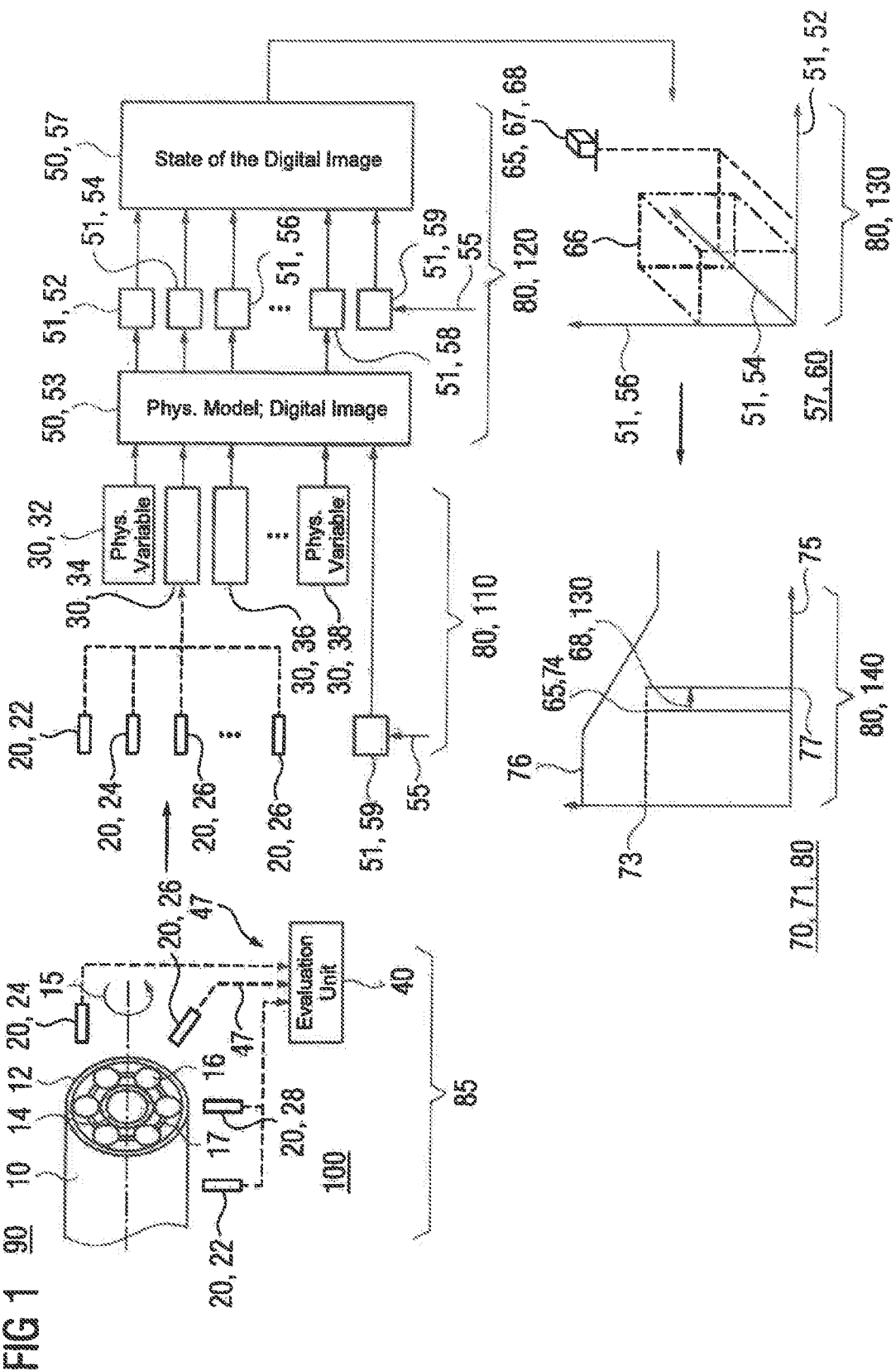

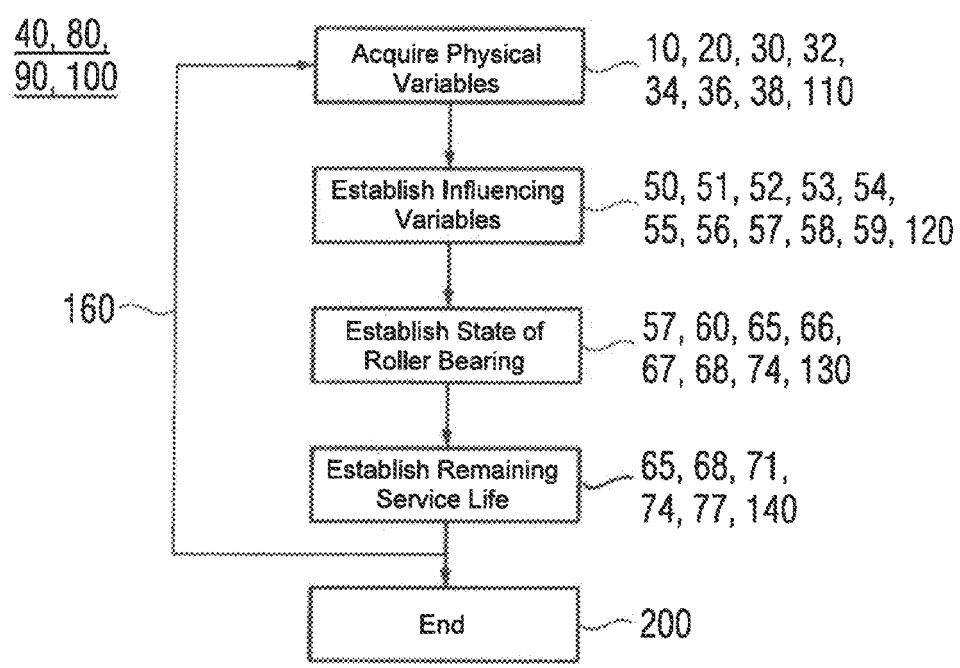

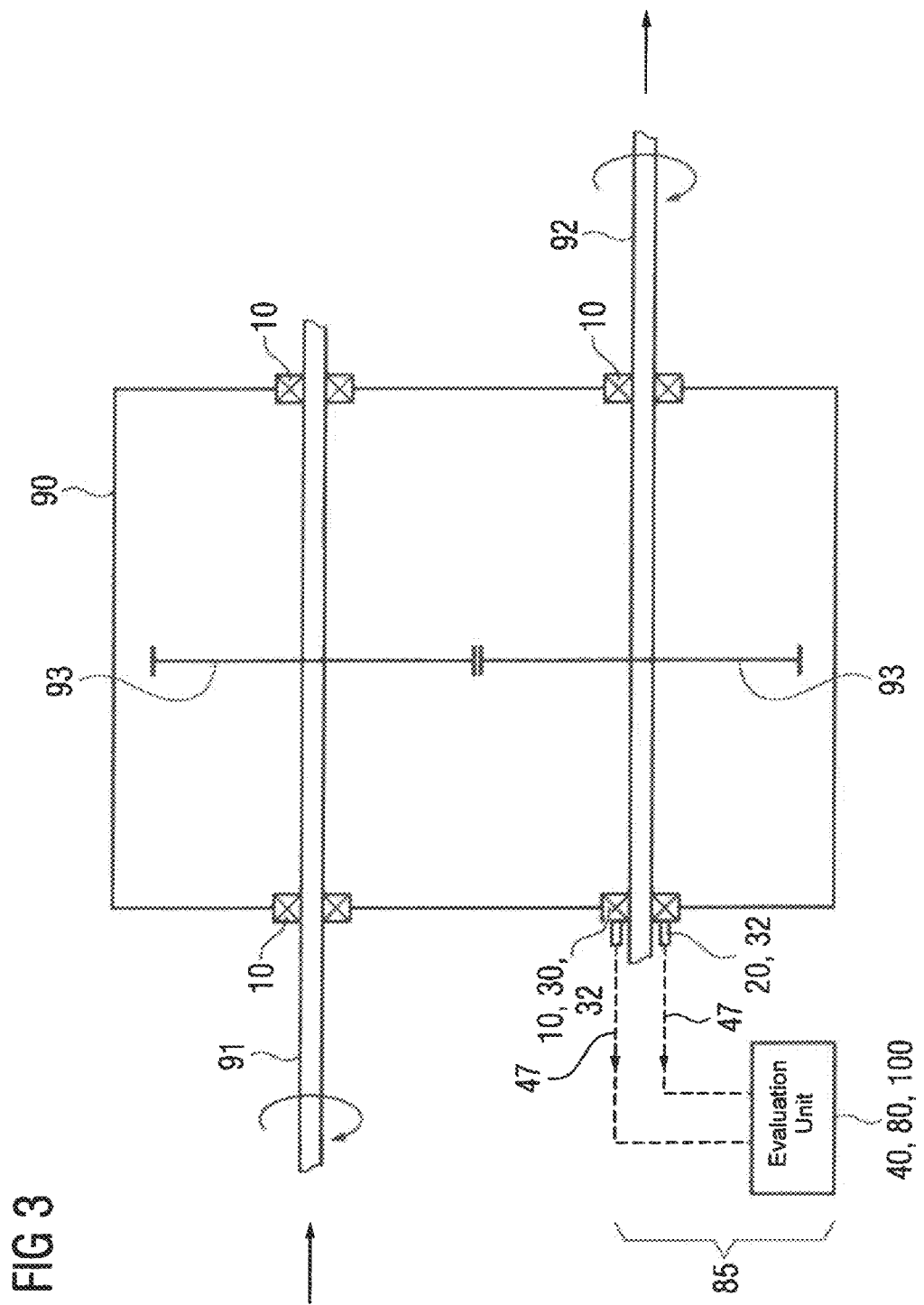

METHOD FOR PREDICTING DAMAGE TO A COMPONENT OF A ROLLER BEARING

CROSS-REFERENCES TO RELATED APPLICATIONS

This application claims the priority of European Patent Application, Serial No. 19194385.1, filed Aug. 29, 2019, pursuant to 35 U.S.C. 119(a)-(d), the content of which is incorporated herein by reference in its entirety as if fully set forth herein.

BACKGROUND OF THE INVENTION

The present invention relates to a method for predicting a damage mechanism, which acts on a component of a roller bearing and brings about what are known as White Etching Cracks. The invention also relates to a computer program product and to an evaluation unit for carrying out such a method. The invention further relates to a corresponding acquisition system and to a machine that is equipped with such a system.

The following discussion of related art is provided to assist the reader in understanding the advantages of the invention, and is not to be construed as an admission that this related art is prior art to this invention.

Roller bearings are employed in a plurality of machines that are subject to demanding operating conditions and are therefore subjected to a plurality of damage mechanisms, also including the White Etching Crack damage mechanism, abbreviated to WEC mechanism. In order to be able to guarantee reliable operation a prediction of the progress of damage is required.

It would therefore be desirable and advantageous to obviate prior art shortcomings and to provide an improved method for predicting damage caused by the WEC mechanism.

SUMMARY OF THE INVENTION

According to one aspect of the present invention, a method for predicting damage to a component of a roller bearing, which may be an outer ring, an inner ring, or a rolling element for example includes performing in a first mechanism phase a first step, in which a plurality of physical variables at the roller bearing are acquired by means of sensors. In a second step of the method at least one first and second influencing variable is established, which are relevant for the damage mechanism. The first and second influencing variables are established on the basis of the physical variable acquired in the first step. An influencing variable is thus essentially to be understood as a derived variable and/or as a variable at the roller bearing that is not able to be acquired directly by means of a sensor. In a third step a damage contribution based on at least the first and second influencing variable is established. The damage contribution in this case is established for a discrete period of time and added as a summand to a damage sum. The damage sum belongs to a first damage accumulation model, which describes how the damage is progressing. In a fourth step a remaining service life of the component is established based on the damage sum in conjunction with the first damage accumulation model. In accordance with the invention the damage mechanism is a White Etching Crack mechanism, abbreviated to WEC mechanism. The WEC mechanism can greatly shorten the service life of a component, so that a prediction about a WEC mechanism allows a reliable operation of the roller bearing, and thus of a machine, in that roller bearings or their components that are too greatly damaged can be replaced.

According to another advantageous feature of the invention, at least one of the physical variables may be a torque, a temperature, in particular a lubricant temperature in the roller bearing or a bearing temperature, a rotational speed, a rotational acceleration, an external current strength present beyond the roller bearing and/or a polarity of an electric current. Compact and cost-effective sensors are available for such variables, which generate sufficiently precise measured values. A plurality of influencing variables of a WEC mechanism is further able to be established in a simple manner from the described physical variables.

Moreover, the at least one first influencing variable can be a Hertzian contact stress, which is present at a rolling contact of the corresponding component, a lubricant film thickness present at the component, slippage, a bearing temperature and/or a lubricant temperature. The Hertzian contact stress can essentially be established based on a torque obtaining in the roller bearing. To this end a bearing force can be established at the roller bearing, from which the torque is able to be established for example from a contact simulation between a roller bearing and an inner ring or an outer ring. In establishing the torque and thus also the Hertzian contact stress, type information of the roller bearing is included. Type information of a roller bearing can comprise a macro geometry variable such as a size specification for at least one component of the roller bearing or a specification of a description or a running surface shape, a micro geometry variable such as a surface roughness, material information, coating information, a lubricant composition, such as for example a specification about additives, kinematic information, or a combination of said information. The lubricant film thickness in its turn is able to be established based on the torque, the rotational speed and the lubricant temperature in combination. The slippage at a component is able to be established with reference to a combination of the torque, the rotational acceleration and the lubricant temperature. Moreover, a current strength in a component of the roller bearing is able to be established with reference to a corresponding model based on the external current strength present beyond the roller bearing.

A presence of a current operating state, in which for the WEC mechanism there is any damage contribution at all and where necessary to what intensity, is represented by the damage contribution. This is able to be established based on a Hertzian contact stress, a slippage at the roller bearing, and a lubricant film thickness. The influencing variables are able to be established rapidly in a simple manner and are able to be processed in the first damage accumulation model. Furthermore, these influencing variables are able to be established solely from rotational speed, rotational acceleration, torque and lubricant temperature. As an alternative the damage contribution based on a Hertzian contact stress, a slippage at the roller bearing, a lubricant film thickness, and/or a current strength in a component of the roller bearing can be established. In this case a second damage accumulation model is used accordingly. Through the current strength as an additional influencing variable the accuracy of the method according to the present invention is increased with little extra effort.

According to another advantageous feature of the invention, the second step, in which at least the first and second influencing variables are established, can be carried out continuously by means of a digital image of the roller bearing. A digital image, also called a digital twin, is to be understood as a simulation that essentially executes permanently, which simulates physical processes relevant to the method. In a method according to the present invention, the digital image or the digital twin manage with a reduced number of physical variables and influencing variables. The digital image in the method according to the present invention is accordingly compact and can also be executed rapidly on simple hardware with low computing power. This allows a cost-effective implementation in hardware, which can also be used in the field. As a result, a roller bearing can be monitored by means of the method according to the present invention essentially in real time for damage from a WEC mechanism. As an alternative the digital image can also be simulated in a physics module that belongs to a complex simulation environment. Such simulation environments are configured to be linked into an Internet-of-Things software environment, abbreviated to IoT environment, such as Siemens Mindsphere for example. This allows a comprehensive monitoring of a corresponding roller bearing. As an alternative or in addition, the first and second influencing variable can also be established with reference to a multidimensional characteristic map. Such a multidimensional characteristic map can be established for example by a separate simulation before use in the field. This enables savings to be made in simulation effort during operation and the execution of the method to be further accelerated and its real-time capability improved for example.

Moreover, the component of the roller bearing, for which damage is predicted by a WEC mechanism, can be an outer ring, an inner ring or a rolling element of a roller bearing. Outer rings and inner ring are able to be described geometrically essentially completely via their external and internal diameter and the form of the running surface embodied thereon. In precisely the same way rolling elements are able to be described geometrically completely by a small number of external dimensions. Accordingly, the method can be carded out in a simple manner with a reduced number of specifications about the component itself. Furthermore, damage by a WEC mechanism frequently occurs on a running surface of an outer ring or inner ring. A method according to the present invention is thus designed explicitly for components occurring most of all for the WEC mechanism. Likewise, by simultaneous application of the method according to the present invention to a number of the components, a prediction can be created as to which of the components will first be sufficiently damaged by the WEC mechanism. Depending on operating condition, application case and roller bearing, different components can fail first. A method according to the present invention therefore has a wide range of applications.

Furthermore, in the fourth step, the remaining service life of the component can be undertaken via a table, a function, an algorithm, and/or an operational simulation. Table values can be obtained in a simple manner from experimental results. Functions that deliver a prediction of a remaining service life of a component are known from other applications and are able to be adapted to a method according to the present invention with little experimental effort. The same applies for algorithms, in which in addition a future loading regime of the components to be expected is able to be set. For example, the number of transitions of loads into different load categories can be acquired in each case. Load categories are to be understood as categories of variable for a torque that is present for example. Assuming that the ratios of numbers for the individual load categories are consistent and only the number of load transitions increases, the remaining service fife is able to be established in this way.

An operating simulation in its turn can in a simple way include data about planned operation of the machine that is equipped with the roller bearing. This can take place for example with reference to data from a control unit of the machine. This enables the point in time at which there is a need to change the roller bearing to be determined especially accurately, and thus the service life of the roller bearing to be able to be largely exploited despite the presence of the WFC mechanism. This allows a reliable and simultaneously economical operation of the machine with the roller bearing.

In accordance with a method according to the present invention, the remaining service life established with reference to the first or second damage accumulation model can be output to a user, an evaluation unit, and/or a control unit of a machine that is equipped with the roller bearing. On the basis thereof a warning in particular can be output, a machine stop initiated, a restriction of operation, such as for example a reduced maximum torque or a reduced maximum rotational speed, configured, and/or a planning of the operation of the machine adapted in its control unit. As an alternative or in addition a maintenance process can also be requested or an instruction to provide a required replacement part output. This enables a reliable and at the same time economical operation of the machine with the roller bearing to be achieved.

According to another aspect of the present invention, the object is achieved by a computer program product. The computer program product is embodied for non-volatile storage and for execution in an evaluation unit that is able to be coupled to a machine. To this end the computer program product can be embodied wholly or partly as software. As an alternative or in addition the computer program product can also be embodied hard-wired, for example as a chip or FPGA. The computer program product can be embodied monolithically or as a number of subprograms, which are able to be executed on separate Hardware and are coupled for communication during operation. For example, the computer program product can be executed in the form of subprograms, which are executed in the evaluation unit, in the control unit in the machine itself and/or on a server of a computer cloud. The computer program product is embodied for receiving and processing measured values of physical variables. The computer program product can further be configured to output a warning, in accordance with the invention the computer program product is configured to carry out at least one method in accordance with one of the forms of embodiment outlined above on the evaluation unit.

According to still another aspect of the present invention, the object is achieved by an evaluation unit, which has a non-volatile memory and a processing unit. The evaluation unit is suitable for connecting, by way of corresponding connections, to sensors that are embodied to acquire physical variables. In accordance with the invention the evaluation unit is equipped with a computer program product, which is embodied according to one of the forms of embodiment outlined above. The evaluation unit can further be embodied to control, during normal operation, a machine to which it is connected. The evaluation unit can be assigned directly to the machine and/or embodied with a higher-ranking control unit, which is coupled to the machine via a data communication connection. A higher-ranking control unit can be a process control computer or a computer cloud for example.

According to yet another aspect of the present invention, the object is achieved by an acquisition system which includes an evaluation unit, which is embodied for acquisition of physical variables at a roller bearing. To this end the evaluation unit is connected to a plurality of sensors. In accordance with the invention, the evaluation unit is embodied as set forth above.

According to still another aspect of the present invention, the object is achieved by a machine which includes a rotatable shaft and/or a toothed wheel, for example a planetary wheel, which is accommodated in a roller bearing. At least one component of the roller bearing is connected to an acquisition system, which is embodied as set forth above. The machine in this case can be any type of apparatus in which shafts are accommodated rotatably in roller bearings, for example gears, planetary gears, industrial gears, or electric motors. A machine of this type is able to be operated reliably and economically by means of the acquisition system.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic process flow diagram of a first embodiment of a method according to the present invention;

FIG. 2 is a schematic process flow diagram of a second embodiment of a method according to the present invention; and FIG. 3 is a schematic representation of a machine according to the present invention.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a process flow diagram of a first exemplary embodiment of a method according to the present invention, generally designated by reference numeral 100. The method 100 is directed to predicting a WEC mechanism at a roller bearing 10, which belongs to a machine 90 not shown in any greater detail. The roller bearing 10 has an outer ring 12, an inner ring 14, a plurality of rolling elements 16 arranged between the rings 12, 14 and a cage 17. During operation a relative rotation 15 occurs between the outer ring 12 and the inner ring 14. Assigned to the roller bearing 10 is a plurality of sensors 20, with which different physical variables 30 are able to be acquired at the roller bearing 10. The sensors 20 include a rotational speed sensor 22, a temperature sensor 24, a torque sensor 26 and a further sensor 28. The rotational speed sensor 26 can be assigned to a shaft not shown in any greater detail and thereby establish the torque at the roller bearing 10. The temperature sensor 24 is embodied to acquire a lubricant temperature and/or a bearing temperature. The sensors 20 are connected to an evaluation unit 40, which is configured to receive and to process measured values 47 from the sensors 20. The evaluation unit 40 is embodied to store a computer program product 80 for execution, with which the described method 100 is implemented. The sensors 20 and the evaluation unit 40 with the computer program product 80 belong to an acquisition system 85 for the machine 90. On this basis a first step 110 is carried out, in which a plurality of measured values 47 is acquired by the sensors 20 at the roller bearing 10 and made available to the evaluation unit 40 as physical variables 30. The physical variables 30 comprise a rotational speed 42, from which a rotational acceleration is able to be derived, a lubricant temperature 34, a torque 36 and at least one further physical variable 38. The physical variables 30 serve as input values for a physics module 53 of a digital image 50, which is also referred to as a digital twin.

In the physics module 53, in a second step 120 of the method 100, influencing variables 51 are established from the physical variables 30. To this end type information 59 for the physics module 53 is made available by means of a memory interrogation 55 by the computer program product 80. The influencing variables 51 include a Hertzian contact stress 52 at a rolling contact in the roller bearing 10, a lubricant film thickness 54, a slippage 56 in the roller bearing 10 and at least one further influencing variable 58. Physical variables 30, which are acquired by the sensors 20, can also serve as further influencing variables 58. In this way a lubricant temperature 34, an external current strength beyond the roller bearing 10, and/or a polarity of this electrical current strength can serve as additional influencing variables 58. In addition type information 59 is also made available by a memory interrogation 55 by the computer program product 80 in the second step 120.

The influencing variables 51 and the type information 59 are employed in a third step 130 as input values for a state module 57 of the digital image 50. The state module 57 is configured to establish whether an operating state relevant for the WEC mechanism is present in the roller bearing 10. A current state 65 of the roller bearing 10 is established based on the influencing variables 51 Hertzian contact stress 52, lubricant film thickness 54 and slippage 56. On this basis a multidimensionally, in particular at least two-dimensionally displayable current state 65, which can lie in a non-critical area 66 in which no damage due to the WEC mechanism occurs, is produced. Accordingly a weighting factor 67 in the non-critical area 66 amounts to zero. Outside the non-critical area 66 there is a progress of the WEC mechanism in the first mechanism phase 42. A current state 65 outside the non-critical area 66 has a weighting factor 67 not equal to zero. From this a damage contribution 68 by which the WEC mechanism is advancing is produced in the third step 130.

In a fourth step 140 the damage contribution 68 is added in a first damage accumulation model 71 to a damage sum 74. The first damage accumulation model 71 has a characteristic curve 76, on the basis of which, in the sense of a Wöhler curve, a remaining service life 77 of the component of the roller bearing 10 is able to be established in the form of a cycles-to-failure 75 at a specific load level 73. The remaining service life 77 established in this way can be output to a user or a warning can be output, if the remaining service life 77 is below a settable warning threshold.

FIG. 2 shows a schematic of a process flow diagram of a second exemplary embodiment of a method 100 according to the present invention, with which the damage progress of a WEC mechanism is to be acquired and predicted. In the following description, parts corresponding with those in FIG. 1 are denoted by identical reference numerals. The method 100 is carried out by means of a computer program product 80, which is stored and executed in non-volatile form on a control unit 40. The control unit 40 in this case is assigned to a machine 90 not shown in any greater detail. There is a first step 110, in which a plurality of physical variables 30 is acquired at a roller bearing 10 by means of assigned sensors 20. The physical variables 30 can be a rotational speed 32 of the roller bearing 10, an existing lubricant temperature 34, a torque 36 acting on the roller bearing 10, or a further physical variable 38. The acquired physical variables 30 are used as a basis in a subsequent second step 120, in order to establish at least a plurality of influencing variables 51. The influencing variables 51 can include a Hertzian contact stress as a first influencing variable 52, a lubricant film thickness as a second influencing variable 54, or a slippage on the roller bearing 10 as a third influencing variable 56, or a further influencing variable 58. The influencing variables 51 are established based on the physical variables 30 acquired in the first step 110 by means of a digital image 50, which is also referred to as a digital twin. To this end the digital image 50, which is essentially embodied as a permanently executing simulation, comprises a physics module 53, which is suitable for receiving and processing physical variables 30. In particular a current strength present away beyond the roller bearing 10 can be used by the physics module 53 to establish a current strength which is present in a component 12, 14, 16, 17 of the roller bearing 10. This takes place for example by simulation. The influencing variables 51 established by means of the physics module 53 of the digital image 50 are further combined in a second step 120 with type information 59, which is also an influencing variable 51. The type information 59 is provided by means of a memory interrogation 55 and describes data that is characteristic for the roller bearing 10. The combination of the present influencing variables 51 forms the state of the roller bearing 10 in a state 57 of the digital image 50. Overall a current state 65 of the roller bearing 10 is able to be derived from the state module 57 in the second step 120.

In the third step 130 the current state 65 of the roller bearing 10 is established based on the state module 57 of the digital image 50. In this case the location of the current state 65 is determined in a state space 60, which essentially comprises all technically meaningful operating states. It is established whether the current state 65 lies within a non-critical area 66, in which the WEC mechanism is not progressing. If the current state 65 lies outside the non-critical area 66, a weighting factor 67 and a damage contribution 68 are established, by which the WEC mechanism is advancing. The damage contribution 68 is further added to an existing damage sum 74, which in the first mechanism phase 42 describes the progress of a first damage accumulation model 71.

In a fourth step 140, based on the first damage accumulation model 71, starting from the current state 65 and the corresponding damage contribution 68, a remaining service life 77 of the roger bearing 10 is established. The remaining service life 77 of the roller bearing 10 in this case can be output as information to a user or to a database. Thereafter the method moves to an end state 200. The first, second, third and fourth step 110, 120, 130, 140 are able to be executed permanently in a loop 160 in order to implement a permanent acquisition of the roller bearing 10.

FIG. 3 shows a schematic of the layout of an exemplary embodiment of a machine, generally designated by reference numeral 90. The machine 90 is embodied as a gear and has at least one input shaft 91 and at least one output shaft 92, which are connected to one another via toothed wheels 93. The input shaft 91 and the output shaft 92 are rotatable and each accommodated in roller bearings 10. A roller bearing 10 is equipped with sensors 20, which are embodied to acquire physical variables 30 at the roller bearing 10, in particular a torque 32, and pass them on as measured values 47 to a control unit 80. The evaluation unit 40 for its part has a computer program product 80, which is embodied to carry out a method 100 outlined above for prediction of damage by a WEC mechanism. The evaluation unit 40 with the computer program product 80 and the sensors 20 belong to an acquisition system 85 with which the machine 90 is equipped.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for predicting damage to a roller bearing, said method comprising:
   a) acquiring a plurality of physical variables of at least one component of the roller bearing;
   b) establishing from the physical variables and from type information of the roller bearing at least a first influencing variable and a second influencing variable;
   c) establishing based on the at least first and second influencing variables a damage contribution to damage to the roller bearing caused by a White Etching Crack (WEC) mechanism and adding the damage contribution to form a damage sum; and
   d) establishing a remaining service life of the at least one component of the roller bearing due to the damage caused by the WEC mechanism from the damage sum and a first damage accumulation model.

2. The method of claim 1, wherein at least one variable of the plurality of physical variables is a torque, a temperature, a torque, a rotational acceleration, a current strength, and/or a polarity of an electric current.

3. The method of claim 1, wherein the first influencing variable is a Hertzian contact stress, a lubricant film thickness, a slippage, a lubricant temperature, and/or a current strength in a component of the roller bearing.

4. The method of claim 3, wherein the damage contribution is established based on at least the Hertzian contact stress, the slippage, the lubricant film thickness and the lubricant temperature in the component of the roller bearing.

5. The method of claim 4, wherein the damage contribution is established in addition based on the current strength in the component of the roller bearing.

6. The method of claim 1, further comprising executing step b) continuously based on a digital image of the roller bearing and/or based on a multidimensional characteristic field.

7. The method of claim 1, wherein the at least one component of the roller bearing is an inner ring, an outer ring, or a rolling element of the roller bearing.

8. The method of claim 1, further comprising executing step d) based on a table, a function, an algorithm and/or an operational simulation.

9. The method of claim 1, further comprising outputting the remaining service life established based on the first damage accumulation model or based on a second damage accumulation model to a user, an evaluation unit and/or a control unit of a machine.

10. A computer program product comprising computer-readable program code embodied on a non-transitory storage medium, which when loaded into a memory of an evaluation unit and executed in the evaluation unit, which is configured to receive and process measured values of physical variables, causes the evaluation unit to predict damage to a roller bearing by
- a) acquiring the physical variables of at least one component of the roller bearing;
- b) establishing from the physical variables and from type information of the roller bearing at least a first influencing variable and a second influencing variable;
- c) establishing based on the at least first and second influencing variables a damage contribution inflicting damage to the roller bearing caused by a White Etching Crack (WEC) mechanism and adding the damage contribution to form a damage sum; and
- d) establishing a remaining service life of the at least one component of the roller bearing due to the damage caused by the WEC mechanism from the damage sum and a first damage accumulation model.

11. An evaluation unit, comprising a non-volatile memory and a processing unit connected to sensors measuring physical variables and configured to execute computer-readable program code embodied on a non-transitory storage medium, which when loaded into a memory of the evaluation unit and executed in the evaluation unit, causes the evaluation unit to predict damage to a roller bearing by
- a) acquiring the physical variables of at least one component of the roller bearing;
- b) establishing from the physical variables and from type information of the roller bearing at least a first influencing variable and a second influencing variable;
- c) establishing based on the at least first and second influencing variables a damage contribution inflicting damage to the roller bearing caused by a White Etching Crack (WEC) mechanism and adding the damage contribution to form a damage sum; and
- d) establishing a remaining service life of the at least one component of the roller bearing due to the damage caused by the WEC mechanism from the damage sum and a first damage accumulation model.

12. An acquisition system, comprising an evaluation unit as set forth in claim 11.

13. A machine, comprising:
- a roller bearing including at least one component which is equipped with an acquisition system as set forth in claim 12; and
- a rotatable shaft supported in the rover bearing.

* * * * *